E. T. KREBS.
MOUTH GAG.
APPLICATION FILED MAR. 23, 1912.

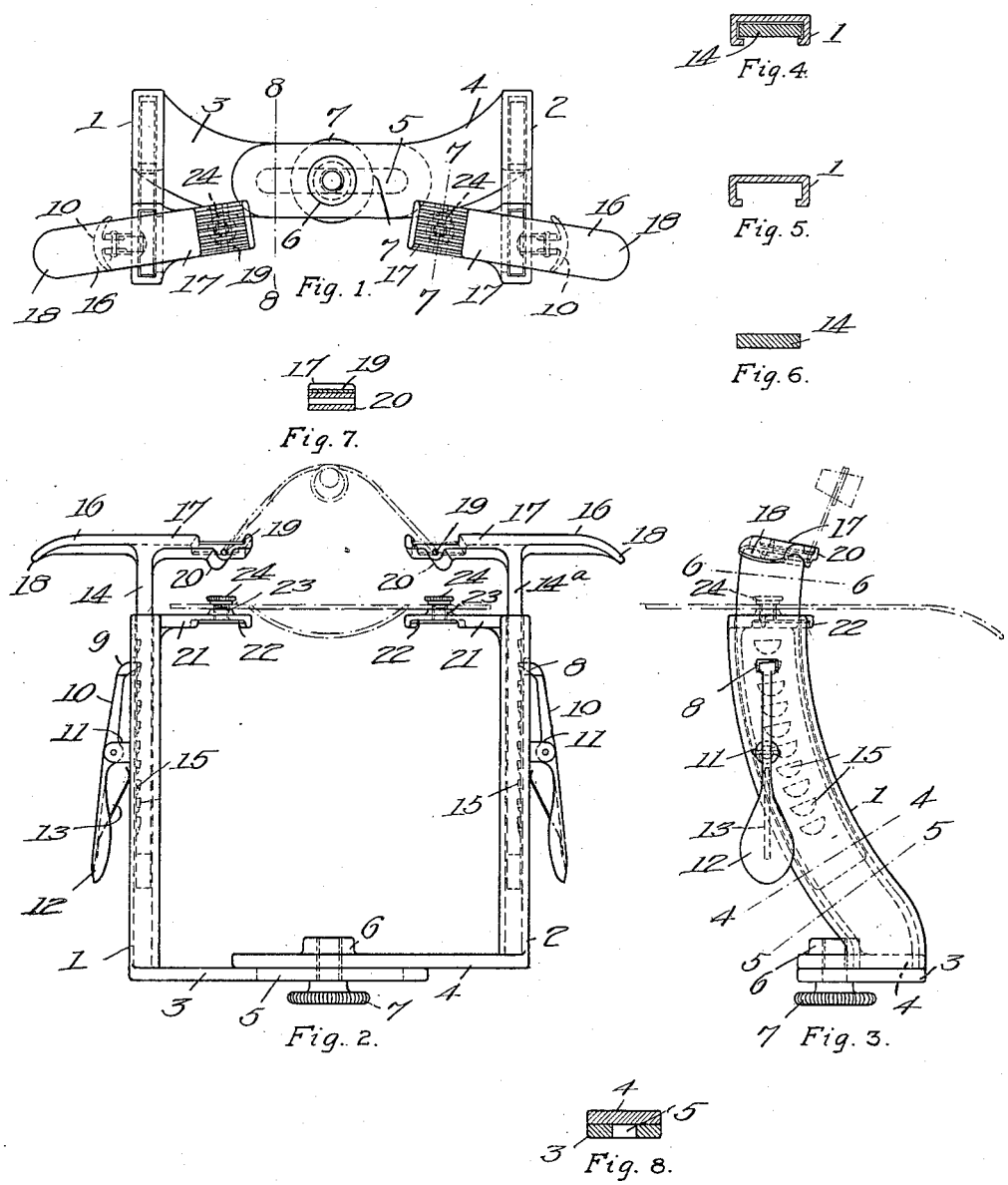

1,036,497.

Patented Aug. 20, 1912.
2 SHEETS—SHEET 2.

WITNESSES

INVENTOR

UNITED STATES PATENT OFFICE.

ERNST T. KREBS, OF CARSON CITY, NEVADA.

MOUTH-GAG.

1,036,497.  Specification of Letters Patent.  Patented Aug. 20, 1912.

Application filed March 23, 1912. Serial No. 685,653.

*To all whom it may concern:*

Be it known that I, ERNST T. KREBS, a citizen of the United States, and a resident of Carson City, in the county of Ormsby and State of Nevada, have invented certain new and useful Improvements in Mouth-Gags, of which the following is a specification.

My invention is an improvement in mouth gags, and has for its object, the provision of a simple and efficient device of the character specified, which may be easily inserted and removed, which will hold the mouth well open without causing pain or injury to the patient, and will leave the hands of the operator free, and which carries a tongue depressor and an illuminating means.

Figure 9:
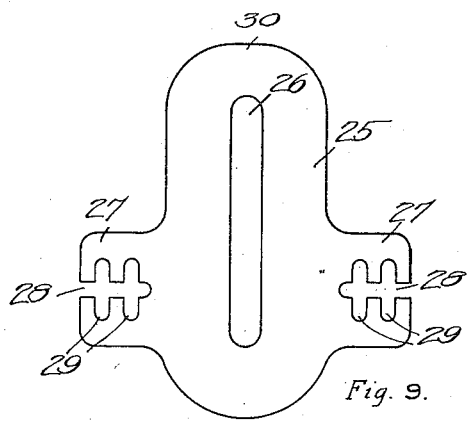
Figure 10:
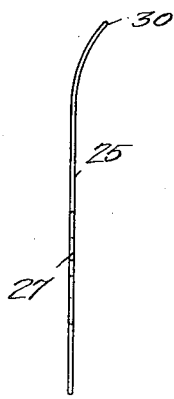
Figure 11:
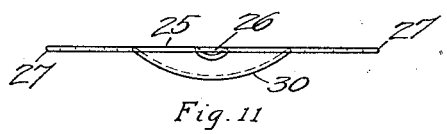
Figure 12:
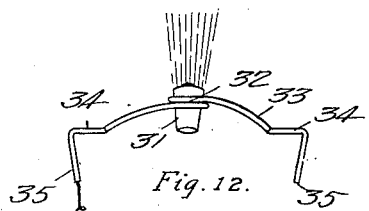
Figure 13:
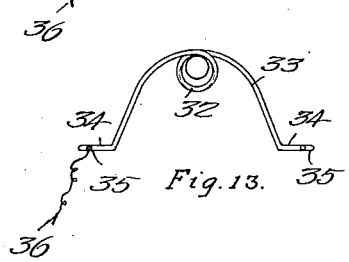
Figure 14:
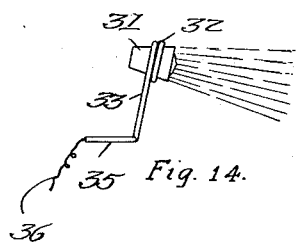

In the drawings: Figure 1 is a top plan view of the improvement, in closed position, with the tongue depressor and illuminating attachment removed; Fig. 2 is a front view with the instrument partly open; Fig. 3 is a side view with the instrument partly open; Figs. 4—5 and 6 are sections on the line 4—4, 5—5 and 6—6, of Fig. 3; Figs. 7 and 8 are sections on the line 7—7 and 8—8 of Fig. 1; Figs. 9—10 and 11 are a top plan, a side and a front view, respectively of the tongue depressor; and, Figs. 12—13 and 14 are a top plan, a front and a side view respectively of the illuminating apparatus.

In the present embodiment of the invention, the gag is composed of a substantially U-shaped frame, consisting of two sections 1 and 2, each of which is provided at its lower end with an angular arm 3 and 4 respectively, each arm extending inwardly at right angles to the section, and lapping upon the arm of the other section. The arm 3 has a longitudinal slot 5, with which registers an internally threaded boss 6 on the arm 4, and a set screw 7 passes through the slot and is threaded into the boss to hold the section in adjusted position.

By loosening the screw 7, which is provided with a milled head, the sections may be adjusted toward and from each other, to fit the mouth, and may afterward be held in firm position by tightening the screw. Each of the sections 1 and 2 is curved in such manner, that the lower ends of the sections are offset inwardly from the upper ends, as shown more particularly in Fig. 3.

Each of the sections 1 and 2 is of channel shape in cross section, as shown in Figs. 4 and 5, the opening of the channel being inwardly, and forming a guideway or groove for receiving a sliding member to be described. Each of the said sections is provided with an opening 8, in its side wall, and near its upper end, into which extends a tooth or catch 9, on the upper end of a lever 10, pivoted intermediate its ends to a post or bracket 11 on the side wall of the section. The lower end of each lever is widened and rounded to form a finger piece 12, and a spring 13 is arranged beneath the said lower end, and acts normally to press the tooth into the opening.

Bars 14 and 14ª are slidably mounted in the channels or guideways of sections 1 and 2, and each bar is provided on its outer face with a longitudinal series of ratchet teeth 15, for engagement by the adjacent catch 9. The bars are movable independently, and each carries a cross head 16—17 at its outer or upper end.

The portion 16 of the cross head of each bar extends outwardly from the bar, and the extremity of the portion is bent downwardly, and the upper face is beveled as shown at 18. Each of the portions 17 of the cross heads is grooved transversely at its inner end, as shown at 19, in Fig. 7, and the bottom of the groove is corrugated. Each portion is also provided with a depending perforated lug 20 near one side of the cross head.

The portions 17 of the cross heads are designed to engage the teeth of the upper jaw, and each of the sections 1 and 2 is provided with an inwardly extending lug 21 at its upper end for engaging the teeth of the lower jaw, for coöperating with the adjacent portion 17 to hold that side of the mouth open.

Each of the lugs 21 is grooved transversely, as shown at 22, and the bottom of the groove is corrugated in the same manner as the grooves 19. The corrugations in the four grooves 19 and 22 extend longitudinally of the cross heads and lugs, and transverse to the alinement of the teeth. Each of the lugs 21 is provided with a perforated internally threaded boss 23 on its upper face, for receiving a set screw 24.

The set screws 24 are designed to hold the tongue depressor shown in Figs. 9—10 and 11, and consisting of a plate 25, having a central longitudinally extending slot 26, and laterally extending lugs or extensions 27, near its lower end. The extensions or lugs 27 are slotted or recessed at 28, from their outer ends, the slots being in alinement and at right angles to slot 26.

Each of the slots 28 is provided with a plurality of spaced transverse slots 29, and the end of the plate remote from the extensions 27 is curved downwardly as indicated at 30, in Figs. 10 and 11, and both of the ends of the plate, as also the ends of the extensions 27 are rounded, as shown in Fig. 9.

The depressor is held to the lugs 21, by means of the screws 24, the said screws being engaged with the slots 28 and 29. The arrangement of the said slots permits the sections 1 and 2 of the frame to be adjusted toward and from each other, to fit the mouth of the patient, and the depressor may also be longitudinally adjusted in order to engage the tongue at the proper point, to properly depress the same, regardless of the size of the mouth.

The portions 17 of the cross heads support the illuminating apparatus shown in Figs. 12 to 14. The said apparatus comprises a lamp 31, held in a bearing 32 at the center of an arch 33, which is provided at each end with an outwardly extending arm 34, having at its outer end a rearwardly and inwardly extending lug 35.

The lugs 35 are received in the perforations in the lugs 20 in the portions 17 of the cross heads, and the arch extends upwardly and rearwardly with respect to the patient, the arrangement being such, that the rays of light from the lamp are thrown inwardly and downwardly, (Figs. 3 and 14), and above the rear end of the depressor (Fig. 3).

The frame for supporting the lamp or a portion thereof, is tubular, and one of the leads 36 for the lamp may extend through the same. The other lead may be connected to the frame. The frame is light and is so arranged that vision is not interfered with, as shown more clearly in Fig. 2. The cross heads 16—17 are inclined with respect to the planes of the bars, the inner ends of the cross heads being inclined inwardly, with respect to the patient.

It will be noticed from an inspection of Fig. 1, that the arms 3 and 4 curve forwardly toward their meeting ends, and the inner ends of the cross heads are inclined toward the arms. This arrangement of the arms, prevents the bearing of the arms against the throat of the patient, and of the cross heads brings the grooves 19 in alinement with the teeth.

The curve of the sections 1 and 2 causes the lower end of the instrument to take a position near the throat of the patient, when in use, and out of the way of the operator. The curve of arms 3 and 4 permits them to fit the throat, and the corrugations of the grooves 19 and 22 prevents the gag from slipping out of place.

The curve or radius of the sections 1 and 2, also the curve or radius of the bars 14—14ª permit of a full bearing of the corrugations of the grooves 19 and 22 upon the teeth mentioned herein, at any angle or opening of the mouth. This curve or radius of the sections 1 and 2, also curve or radius of the bars 14—14ª is a radius of the average patent's jaw, from temporo-maxillary articulation to the teeth that engage with the corrugations of the grooves 19 and 22. This radius or curve assists in preventing the gag from slipping out of place.

In the use of the gag, the sections 1 and 2 of the frame are adjusted for the width, by loosening screw 7 to permit the adjustment and tightening of the screw to hold the sections in adjusted position. The bars 14—14ª are then adjusted to proper position, by pushing or pulling upward on the portions 16. The teeth 15 and catch 9 are so arranged that the bars may move upward freely, but cannot move downward, until the lever is operated to release the catch.

The tongue depressor is adjusted after the sections 1 and 2 are in proper position, and is so arranged that the curved end 30 will engage the base of the tongue, where it begins to curve downwardly. The frame 33 may be removed when there is sufficient light to permit the lamp to be dispensed with. The frame is easily slipped into or out of place.

The rests for the teeth, that is the lugs 19 and portions 17 of the cross heads are preferably provided with composition or soft lead pads, to prevent injury to the teeth, the said pads being seated in the grooves. The rests are preferably engaged with the bicuspid and anterior molar teeth, and since the gag engages eight teeth, two at each rest, a secure grip is obtained.

The gag is entirely out of the way of the operator, no part thereof, when in use, being farther forward than the rests 19—22. The gag cannot drop or slip out of the mouth accidentally, but may be easily disengaged, merely by pressing the finger pieces 12 to operate levers 10 to release the catch 9. The slot 26 prevents the tongue from slipping from beneath the rest. A portion of the tongue pushes through the slot, forming an efficient hold.

In inserting the gag, after the proper adjustment, the thumb of each hand should be placed between the bars 14—14ª and the screws 24, with the upper side of the index finger against the lower surface of the portions 17 of the cross head, which serve as handles for operating the bars. When so held the rests 17—21 are inserted between the jaws, and the handles 16 are pressed or pushed upwardly by the index fingers, until the jaws have been sufficiently separated.

.To release and move the gag, it is only necessary to press the ends 12 of the levers toward each other, and should the first insertion be not exactly satisfactory, the gag being held for insertion as above described, a slight pressure of the palms of the hands on the portions 12 will simultaneously release both levers.

I claim:—

1. A mouth gag comprising a frame composed of sections, each section having a channel or groove on its inner face provided with overlying flanges and an arm at its lower end extending inwardly, said arms curving laterally toward their inner ends and overlapping, one arm having a longitudinal slot and the other a threaded opening registering therewith, a screw passing through the slot and engaging the opening for clamping the sections together, each section having an inwardly extending lug at its upper end provided with a transverse groove, and with a boss having a vertical threaded perforation on the inner side of the groove, a bar slidable in the channel of each section, each bar having a cross head at its upper end extending approximately parallel with the adjacent arm, the outer end of each cross head being curved downwardly to form a handle and the inner end having a transverse groove, and a depending transversely perforated lug adjacent to the groove and below the same, a lever pivoted on the outer face of each section and provided at its lower end with a fingerpiece and at its upper end with an inwardly extending catch, the section having an opening for permitting the catch to engage the bar, each bar having a longitudinally extending series of ratchet teeth on the face adjacent to the lever, said teeth facing downwardly, a spring pressing the catch toward the teeth, a tongue depressor having a lateral extension at each side, each extension having a slot extending from the end of the extension transversely of the depressor and lateral slots extending from each side of the first-named slots, a screw passing through the slots and engaging the threaded boss of the lug of the section, and a frame for supporting a lamp having lugs for engaging the depending lugs of cross heads.

2. A mouth gag comprising a frame composed of sections, each section having a channel or groove on its inner face provided with overlying flanges and an arm at its lower end extending inwardly, said arms curving laterally toward their inner ends and overlapping, one arm having a longitudinal slot and the other a threaded opening registering therewith, a screw passing through the slot and engaging the opening for clamping the sections together, each section having an inwardly extending lug at its upper end provided with a transverse groove, a bar slidable in the channel of each section, each bar having a cross head at its upper end extending approximately parallel with the adjacent arm, the outer end of each cross head being curved downwardly to form a handle and the inner end having a transverse groove, a lever pivoted on the outer face of each section and provided at its lower end with a fingerpiece and at its upper end with an inwardly extending catch, the section having an opening for permitting the catch to engage the bar, each bar having a longitudinally extending series of ratchet teeth on the face adjacent to the lever, said teeth facing downwardly, and a spring pressing the catch toward the teeth.

3. A mouth gag comprising a frame composed of sections, each section having a channel or groove on its inner face provided with overlying flanges and an arm at its lower end extending inwardly, said arms curving laterally toward their inner ends and overlapping, one arm having a longitudinal slot and the other a threaded opening registering therewith, a screw passing through the slot and engaging the openings for clamping the sections together, each section having an inwardly extending lug at its upper end provided with a transverse groove, a bar slidable in the channel of each section, each bar having a cross head at its upper end lying substantially parallel with the adjacent arm, the outer end of the cross head being curved to form a handle and the inner end having a transverse groove, means on each section for adjustably engaging the adjacent bar to prevent inward sliding movement and to permit free outward sliding movement, a tongue depressor detachably supported by the lugs of the sections, and an illuminating apparatus detachably connected with the inner ends of the cross heads.

4. A mouth gag comprising a frame composed of sections, each section having a channel or groove on its inner face provided with overlying flanges and an arm at its lower end extending inwardly, an adjustable connection between the arms, means for clamping the arms together, a bar slidable in the channel of each section, each section having an inwardly extending lug at its upper end provided with a transverse groove, a cross head at the upper end of each bar extending approximately parallel with the lug of the adjacent section, an adjustable connection between each bar and the adjacent section for permitting the bar to move freely away from the section and for preventing reverse movement, means on the lugs of the sections for supporting a tongue depressor, and means on the inner ends of the cross heads for supporting an illuminating apparatus.

5. A mouth gag comprising a frame composed of sections, each section having a channel or groove on its inner face provided with overlying flanges and an arm at its lower end extending inwardly, an adjustable connection between the arms, means for clamping the arms together, a bar slidable in the channel of each section, each section having an inwardly extending lug at its upper end provided with a transverse groove, a cross head at the upper end of each bar extending approximately parallel with the lug of the adjacent section, and an adjustable connection between each bar and the adjacent section for permitting the bar to move freely away from the section and for preventing reverse movement.

6. A mouth gag comprising a frame composed of sections, each section having a channel or groove on its inner face provided with overlying flanges and an arm at its lower end extending inwardly, an adjustable connection between the arms, means for clamping the arms together, a bar slidable in the channel of each section, each section having an inwardly extending lug at its upper end provided with a transverse groove, an outwardly extending handle and an inwardly extending lug at the upper end of each bar, each lug having a transverse groove, and means for permitting the bars to move freely with respect to the sections in a direction to separate the adjacent lugs and for preventing the reverse movement.

7. A mouth gag comprising a plurality of pairs of telescoping members, the pairs being arranged alongside each other, an adjustable connection between the outer members of the pairs at the upper ends thereof, an inwardly extending lug at the lower end of each of the outer members, an inwardly extending lug at the upper end of each inner member, means for permitting the members of each pair to move freely in a direction to separate the adjacent lugs and for preventing the reverse movement, an outwardly extending handle on the outer end of each inner member, means on the lugs of the outer members for supporting a tongue depressor, and means on the lugs of the inner members for supporting an illuminating apparatus.

8. A mouth gag comprising a plurality of pairs of telescoping members, the pairs being arranged alongside each other, an adjustable connection between the outer members of the pairs at the upper ends thereof, an inwardly extending lug at the lower end of each of the outer members, an inwardly extending lug at the upper end of each inner member, means for permitting the members of each pair to move freely in a direction to separate the adjacent lugs and for preventing the reverse movement, and an outwardly extending handle on the upper end of each inner member.

9. A mouth gag comprising a plurality of pairs of telescoping members, the pairs being arranged alongside each other, an adjustable connection between the outer members of the pairs at the upper ends thereof, an inwardly extending lug at the lower end of each of the outer members, an inwardly extending lug at the outer end of each inner member, and means for permitting the members of each pair to move freely in a direction to separate the adjacent lugs and for preventing the reverse movement.

10. In a device of the character specified, a tongue depressor comprising a plate having a longitudinal slot and one end curved laterally, and an extension at each side of the plate near the opposite end, each extension having a slot at its outer end transverse to the first-named slot, said last-named slots having recesses extending from each side thereof.

11. In a device of the character specified, means for supporting an illuminating device, comprising an arched frame provided with a bearing for the said device at approximately its center, and having at each end an outwardly extending arm provided at its free end with a rearwardly extending lug, a portion of the frame being tubular for the passage of a lead.

ERNST T. KREBS.

Witnesses:
HERMAN P. HUELLE,
J. C. TRANTER.

---

Copies of this patent may be obtained for five cents each, by addressing the "Commissioner of Patents, Washington, D. C."